(12) United States Patent
Khonsari et al.

(10) Patent No.: US 9,599,228 B2
(45) Date of Patent: Mar. 21, 2017

(54) COOLED SEAL

(71) Applicants: Michael M. Khonsari, Baton Rouge, LA (US); Nian Xiao, Baton Rouge, LA (US)

(72) Inventors: Michael M. Khonsari, Baton Rouge, LA (US); Nian Xiao, Baton Rouge, LA (US)

(73) Assignee: Louisiana State University and Agricultural & Mechanical College, Baton Rouge, LA (US)

( * ) Notice: Subject to any disclaimer, the term of this patent is extended or adjusted under 35 U.S.C. 154(b) by 49 days.

(21) Appl. No.: 13/887,511

(22) Filed: May 6, 2013

(65) Prior Publication Data
US 2014/0327211 A1 Nov. 6, 2014

(51) Int. Cl.
F16J 15/34 (2006.01)

(52) U.S. Cl.
CPC ................. *F16J 15/3404* (2013.01)

(58) Field of Classification Search
USPC ............... 277/358, 360, 399, 400, 401, 408
See application file for complete search history.

(56) References Cited

U.S. PATENT DOCUMENTS

| | | | | |
|---|---|---|---|---|
| 1,683,756 A * | 9/1928 | Blache | ...................... | 277/360 |
| 2,858,149 A * | 10/1958 | Laser | ......................... | 277/360 |
| 3,804,424 A * | 4/1974 | Gardner | ...................... | 277/360 |
| 3,917,289 A * | 11/1975 | Ivanov et al. | ................. | 277/400 |
| 4,007,940 A * | 2/1977 | Chapa | ......................... | 277/358 |
| 4,407,513 A * | 10/1983 | Takenaka et al. | ............ | 277/400 |
| 4,489,951 A * | 12/1984 | Kataoka et al. | .............. | 277/362 |
| 4,523,764 A * | 6/1985 | Albers et al. | ................. | 277/400 |
| 4,613,141 A * | 9/1986 | Heinen | ....................... | 277/359 |
| 4,714,257 A * | 12/1987 | Heinrich et al. | .............. | 277/307 |
| 4,733,873 A * | 3/1988 | Takenaka et al. | ............ | 277/400 |
| 5,071,141 A * | 12/1991 | Lai et al. | ....................... | 277/400 |
| 5,895,051 A * | 4/1999 | Bowers | ....................... | 277/346 |
| 6,142,478 A * | 11/2000 | Pecht et al. | .................... | 277/400 |
| 6,224,060 B1 * | 5/2001 | Parker et al. | ................. | 277/365 |
| 6,341,782 B1 * | 1/2002 | Etsion | .......................... | 277/399 |
| 6,425,583 B1 * | 7/2002 | Muraki | ........................ | 277/358 |
| 6,494,458 B2 * | 12/2002 | Uth | ................................. | 277/358 |
| 6,616,144 B2 * | 9/2003 | Theodore, Jr. | ................ | 277/358 |
| 6,942,219 B2 * | 9/2005 | Khonsari et al. | ............. | 277/360 |
| 7,066,469 B2 * | 6/2006 | Stephens et al. | ............. | 277/359 |

(Continued)

OTHER PUBLICATIONS

Boliven Patents—JP58146770: Mechanical Seal—Details, Printout of web-page www.boliven.com/patent/JP58146670 on Feb. 7, 2013, publication date of web-page is unknown, purported publication date of the underlying reference, application No. JP57026558, is Sep. 1, 1983.

(Continued)

*Primary Examiner* — Kristina Fulton
*Assistant Examiner* — Eugene G Byrd
(74) *Attorney, Agent, or Firm* — John B. Edel; Edel Patents LLC

(57) ABSTRACT

Seals having incorporated heat pipes are disclosed relating to pumps and other comparable sealing equipment that may include a seal face, a cavity, a wicking material within the cavity, and a working fluid within the cavity. The seals may be used as a pump seal rings and in other applications having comparable heat transfer requirements.

16 Claims, 4 Drawing Sheets

(56) References Cited

U.S. PATENT DOCUMENTS

| | | | |
|---|---|---|---|
| 2002/0014743 A1* | 2/2002 | Zheng | 277/358 |
| 2010/0230905 A1* | 9/2010 | Iizuka | F16J 15/164 |
| | | | 277/584 |
| 2010/0283210 A1* | 11/2010 | Kirchner et al. | 277/377 |
| 2011/0169225 A1* | 7/2011 | Winkler et al. | 277/408 |
| 2013/0042477 A1 | 2/2013 | Chou | |

OTHER PUBLICATIONS

Xiao, Nian, A review of mechanical seals heat transfer augmentation techniques, 2013 Recent Patents on Mechanical Engineering 2013, vol. 6, No. 2, p. 87-96.

\* cited by examiner

COOLED SEAL

Seals described herein may be used in conjunction with common pump varieties. Certain seals disclosed herein have improved heat transfer characteristics and may enhance the useful life of seal systems generally.

Sealing apparatus described herein may, for example, comprise a seal face; a cavity; a wicking material within the cavity; and a working fluid within the cavity; wherein the sealing apparatus is arranged and configured as a pump seal ring; and wherein the sealing apparatus has a width ratio of at least 0.25.

Methods of operating sealing apparatus described herein may, for example, comprise engaging a first seal ring in frictional rotating contact with a second seal ring; wherein the first seal ring comprises a cavity, a wicking material within the cavity, a working fluid within the cavity, and a flush surface; and flushing a flush surface of the first seal ring with a flush fluid.

Pumps described herein may, for example, comprise a mating ring comprising a cavity, a seal face, a wicking material within the cavity, a working fluid within the cavity, and a fluid exposed heat transfer surface; and a fluid flush in contact with the fluid exposed heat transfer surface. In a related example, the fluid exposed heat transfer surface may be within 25° of perpendicular to the seal face. In a further related example, the cavity may be arranged and configured such that the fluid exposed heat transfer surface removes at least 40% of the heat input through the seal face. In a still further related example, the cavity may be a channel having an internal channel width and an internal channel depth; wherein the mating ring has an outer wall flush length representing the depth of the fluid exposed heat transfer surface; and wherein the mating ring has a prime ratio of at least 0.13.

EXAMPLES

Example 1

Figure 1:
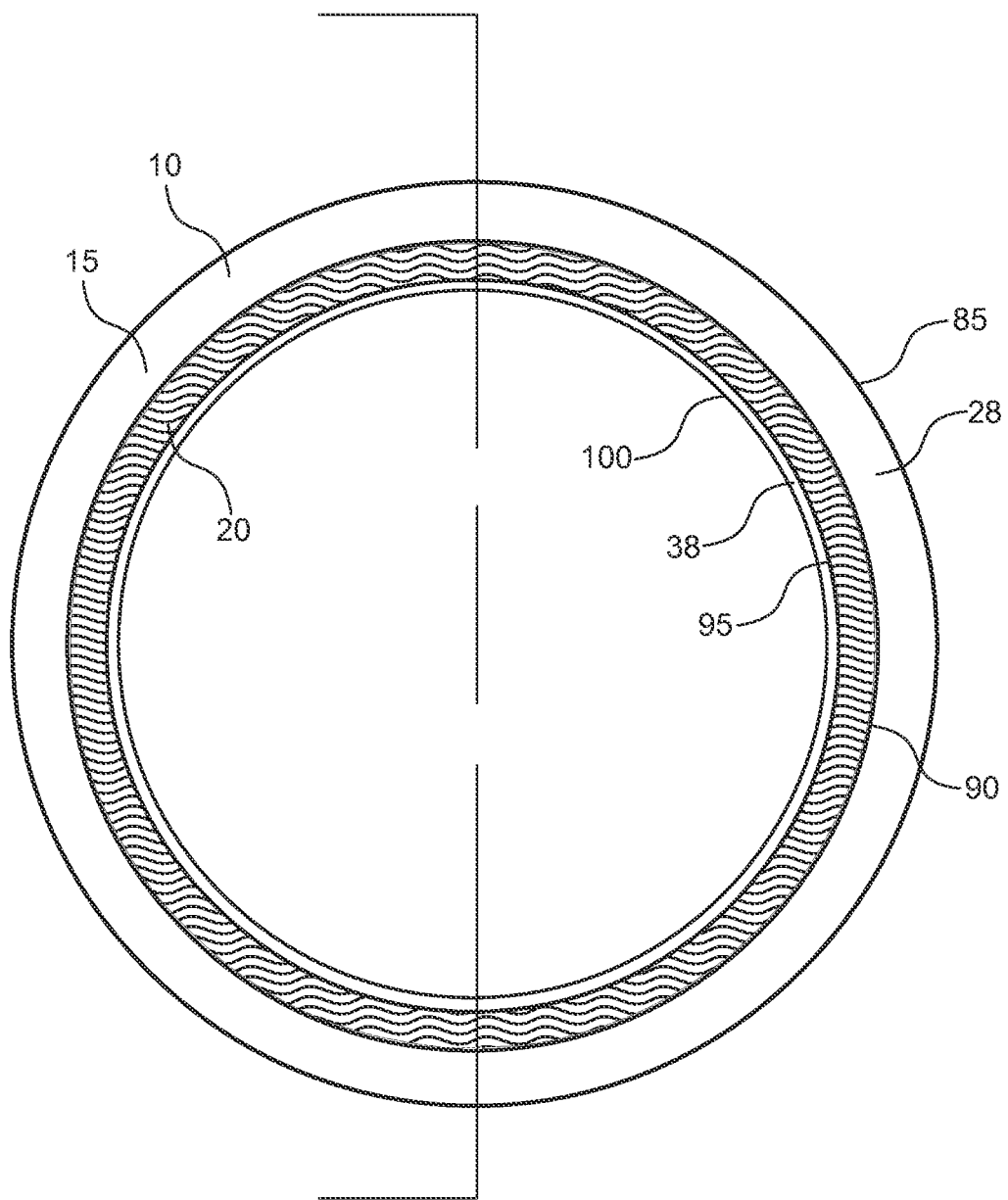
FIG. 1 depicts a mating ring forward element and a mating ring heat pipe cavity.

Referring now to FIG. 1 of the drawings, Mating ring forward element 15 and Mating ring heat pipe cavity 20 are component parts of Mating ring 10 which is ultimately a component part of the seal system of a pump. Mating ring forward element 15 may be a contiguous element comprising both Heat pipe outer wall 28 and Heat pipe inner wall 38. The structure of Mating ring forward element 15 is situated between Heat pipe outer wall outer surface 85 and Heat pipe inner wall external surface 100. Mating ring heat pipe cavity 20 is both internal to Mating ring 10 and bounded by Heat pipe outer wall inner surface 90 and Heat pipe inner wall heat pipe surface 95. Mating ring heat pipe cavity 20 is also in the form of a ring.

Figure 2:
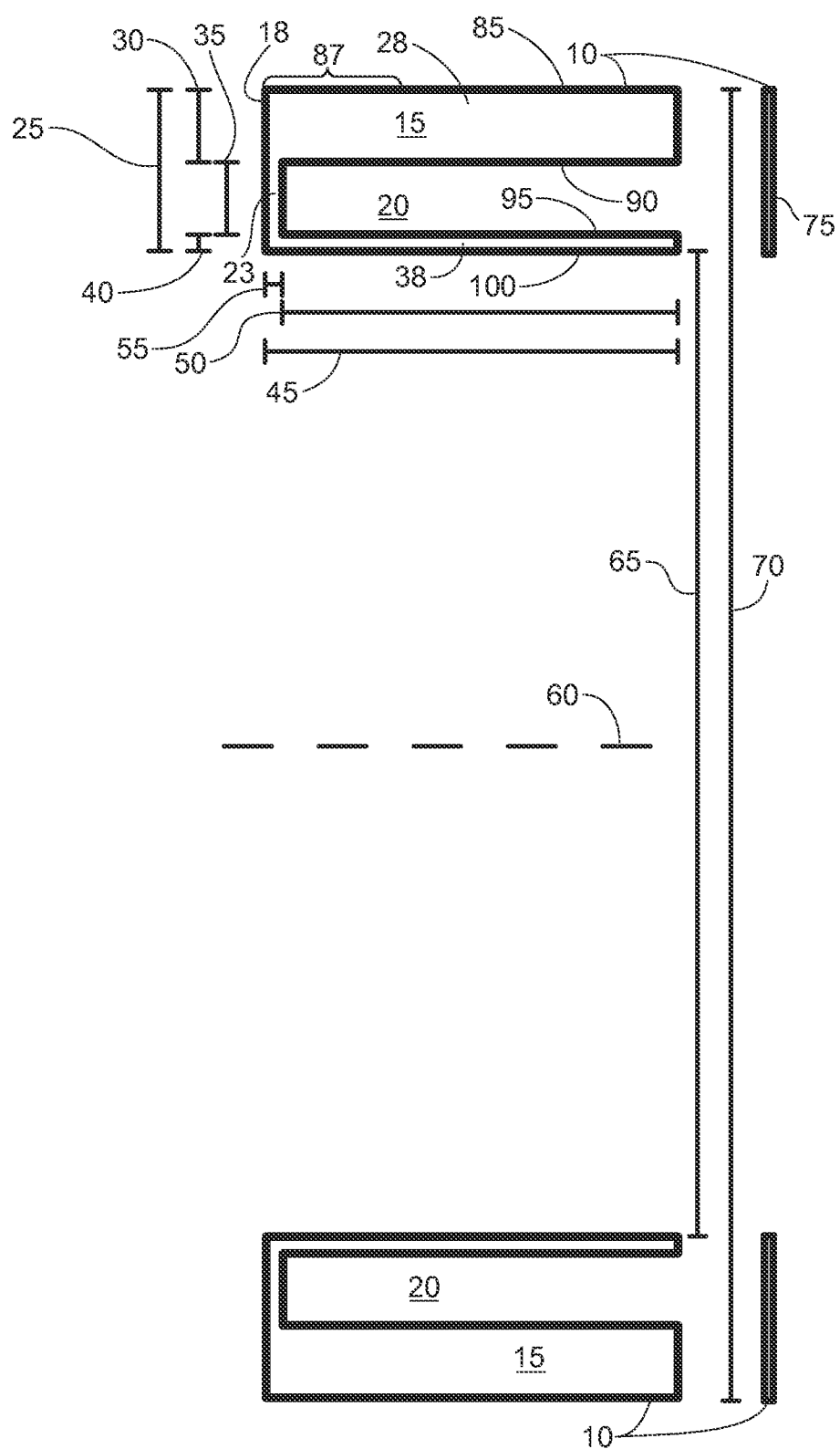
FIG. 2 is an exploded cross-sectional view of a mating ring.

Referring now to FIG. 2 of the drawings, Mating ring 10 comprises Mating ring forward element 15, Mating ring heat pipe cavity 20, and Mating ring cap 75. Mating ring heat pipe cavity 20 is bounded by Heat pipe outer wall inner surface 90 and Heat pipe inner wall heat pipe surface 95. Mating ring heat pipe cavity 20 is further bounded by Heat pipe inner wall 38 and Heat pipe outer wall 28. Mating ring forward element 15 is bound by Heat pipe outer wall outer surface 85 and Heat pipe inner wall external surface 100. Mating ring seal wall 23 is the portion of Mating ring 10 that serves as the primary sealing surface and Mating ring seal face 18 is the portion of Mating ring 10 that is the actual sealing surface. Mating ring seal face width 25 represents the width of Mating ring forward element 15. Heat pipe outer wall width 30 represents the width of Heat pipe outer wall 28. Heat pipe internal channel width 35 represents the width of Mating ring heat pipe cavity 20. Heat pipe inner wall width 40 represents the width of Heat pipe inner wall 38. In the depicted embodiment, Mating ring seal face width 25 is the sum of Heat pipe outer wall width 30, Heat pipe internal channel width 35, and Heat pipe inner wall width 40. Heat pipe forward element depth 45 represents the depth of Mating ring forward element 15. Seal face to heat pipe depth 55 represents the distance between Mating ring seal face 18 and Mating ring heat pipe cavity 20. Heat pipe internal channel depth 50 represents the depth of Mating ring heat pipe cavity 20 and in the depicted embodiment, Heat pipe forward element depth 45 is the sum of Heat pipe internal channel depth 50 and Seal face to heat pipe depth 55. Mating ring 10 is substantially symmetrical about Central axis 60. Heat pipe internal diameter 65 represents the diameter of the cylinder formed by Heat pipe inner wall external surface 100 and Heat pipe external diameter 70 represents the diameter of the cylinder formed by Heat pipe outer wall outer surface 85. During operation of the pump a portion of Heat pipe outer wall outer surface 85 of Mating ring forward element 15 is flushed with a flush fluid that may be water. This fluid contact surface aids in the removal of heat from Mating ring seal face 18. The length of Heat pipe forward element depth 45 that is continuously exposed to that flush is represented by Heat pipe outer wall flush length 87.

Figure 3:
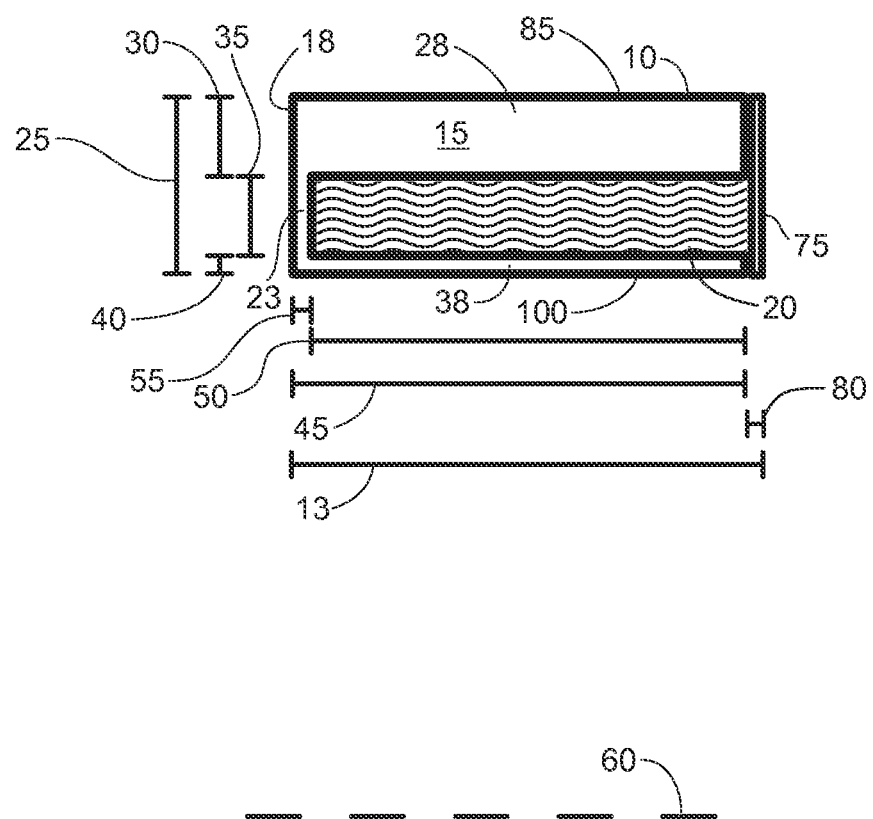
FIG. 3 is a cross-sectional view of an assembled mating ring.
Figure 3:
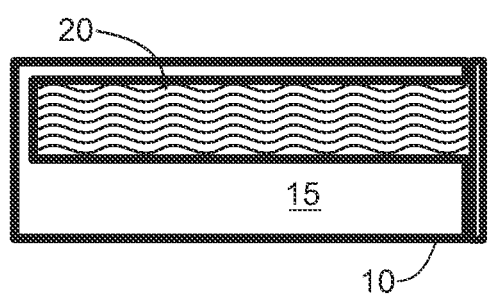

Referring now to FIG. 3 of the drawings, Mating ring forward element 15, Mating ring seal face 18, Mating ring heat pipe cavity 20, Mating ring seal wall 23, Mating ring seal face width 25, Heat pipe outer wall 28, Heat pipe outer wall width 30, Heat pipe internal channel width 35, Heat pipe inner wall 38, Heat pipe inner wall width 40, Heat pipe forward element depth 45, Heat pipe internal channel depth 50, Seal face to heat pipe depth 55, Central axis 60, Heat pipe outer wall outer surface 85, and Heat pipe inner wall external surface 100 are substantially as depicted in FIG. 2. However, Mating ring 10 comprises Mating ring forward element 15 which is sealed against Mating ring cap 75 to form a fluid barrier between Mating ring heat pipe cavity 20 and the environment outside of Mating ring 10. In the present embodiment, Mating ring depth 13 is the sum of Seal face to heat pipe depth 55, Heat pipe internal channel depth 50, and Mating ring cap thickness 80. Alternatively, Mating ring depth 13 is the sum of Mating ring cap thickness 80 and Heat pipe forward element depth 45.

Mechanical face seals typically comprise of a primary ring, which is attached to the shaft and thus rotates, and a mating ring, which is held stationary in gland. An axially mounted spring or bellows are used to push the primary ring against the mating ring and apply a fixed closing force. In this design, the heat pipe is integrated into the seal mating ring and there is no need to modify the geometry of ring exterior, housing structure and flush arrangement. The associated heat transfer in such embodiments may address the root cause of seal failures due to interfacial temperature rise. Thermocracking and hot spotting are examples of the problems that occur due to thermal effect. Embodiments described herein mitigate heat related seal damage increasing seal life, decreasing leakage and increasing containment effectiveness.

Example 2

A mating ring configured substantially as described in Example 1 was tested for its ability to dissipate heat at the seal face. The mating ring was constructed of stainless steel (17-4 PH). Three channels are cut through from rear end of the mating ring to 1 mm away from front end of the mating ring such that a the mating ring had a channel substantially in the form depicted in FIG. 1 with the exception that the heat pipe channel was not continuous. In other words, the path was interrupted at three locations that were preserved for the insertion of measuring instruments associated with the test.

Dimensions for the tested mating ring included: a Seal face to heat pipe depth 55 of approximately 1 mm, a Mating ring seal face width 25 of approximately 9 mm, a Heat pipe outer wall width 30 of approximately 5 mm, a Heat pipe inner wall width 40 of less than 1 mm, a Heat pipe forward element depth 45 of approximately 14 mm, a Heat pipe internal diameter 65 of approximately 58 mm, and a Heat pipe external diameter 70 of approximately 67 mm.

The experimental results show that by means of phase change, this design is capable of significantly reducing the temperature at the seal rings interface. Three holes are drilled through the rear end as one pin hole and two thermocouples holes. A first thermocouple was used to measure the interface temperature. A second thermocouple was used to measure the saturated vapor temperature within the heat pipe. After construction, the mating ring was heat treated to a Rockwell C hardness of 45. Then, the wick made of steel wool was inserted into the housing. Although it is envisioned that other embodiments would have only a thin layer wick attached to the outer diameter wall the channel was filled with the steel wool. Three filling holes were circumferentially drilled through mating ring side-wall to fill in the working fluid. A thin copper cap was soldered to cover the heat pipe housing opening and epoxy was used to seal the cap and ensure no water or vapor escape from it. After injecting 1 ml water into each channel to serve as the working fluid, the holes were tightly sealed. The mating ring was put into a vacuum oven to lower the pressure to near absolute zero and the filling holes were sealed by waterproof sealant. Finally, the mating ring front end face was lapped to a surface finish between 1-2 helium light bands.

The mating ring was installed in a test rig seal with a carbon graphite primary ring. The test rig complied with API standard 682 and comprised a working fluid reservoir with built-in heat exchanger, a cast iron centrifugal pump from American Machine and Tool Company Inc. of 400 Spring Street, Royersford, Pa. 19468, Model number 1626 and a seal housing. J-type thermocouples were used to measure temperature. The primary and mating rings interface, vapor and flush fluid temperature are the primary data collected. The interface temperature was then compared with previously measured conventional and surface textured rings temperature to verify the effectiveness of the built-in heat pipe. The primary ring was made of carbon graphite, pressed against the mating ring with a spring force of 138 KPa. The friction coefficient between primary ring and stainless steel was measured to be about 0.12. The shaft rotating speeds were set to 1,800 rpm and 2,700 rpm. The flush fluid was a 70% propylene glycol solution in water by volume. The flush rate was 1.7 gpm and fluid inlet pressure was 207 KPa. The conditions of the tests on the mating ring with the built-in heat pipe were run under the same conditions as the conventional mating ring that was tested.

Under identical conditions, the seal maximum temperature was 64° C. in the conventional design. With the heat pipe, the interface temperature of mating ring was only 47.2° C. at 1,800 rpm. Another improvement was observed when the rotating speed is increased to 2,700 rpm. At 2,700 rpm the heat pipe ring ran at 51.1° C. whereas for the conventional plain ring ran at 77° C. Table 1 shows the interface temperature normalized with the working fluid outlet temperature. The heat pipe seal ring operates at a lower seal housing flush fluid temperature than comparable operation of a conventional seal ring due to the significant reduction of seal face temperature.

TABLE 1

|  | Conventional (° C.) | Heat pipe (° C.) |
| --- | --- | --- |
| 1,800 rpm | 23.4 | 8.3 |
| 2,700 rpm | 35.6 | 11.8 |

Figure 4:
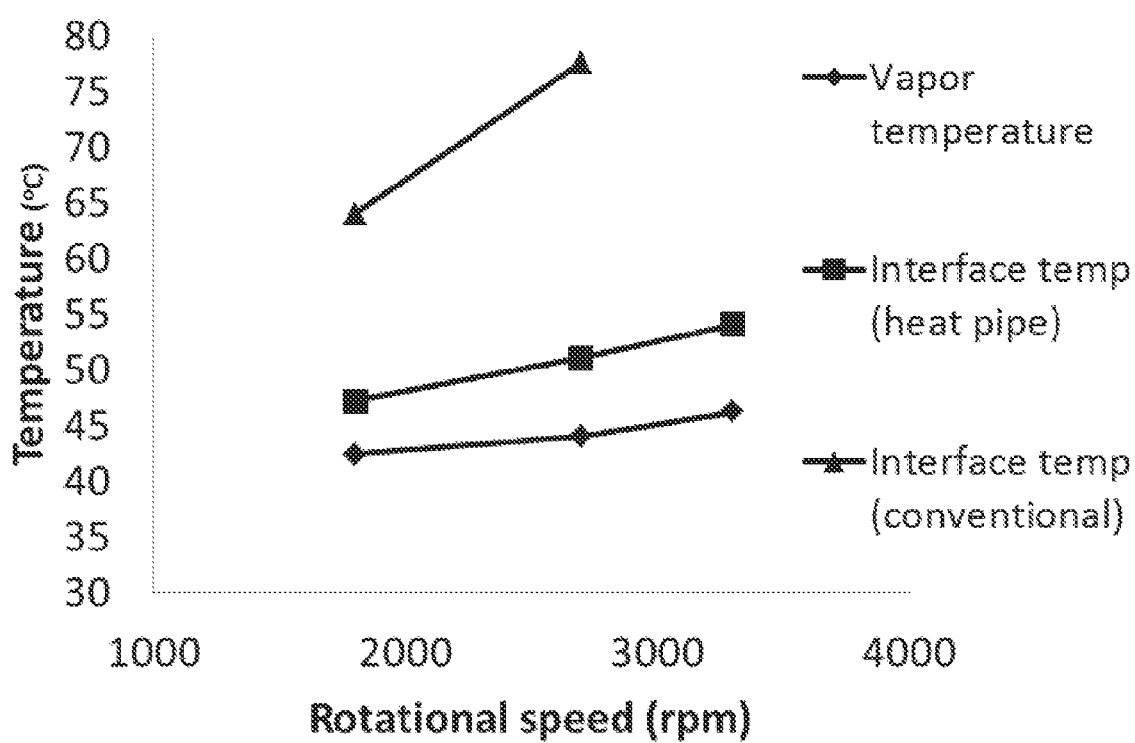
FIG. 4 presents temperature data for conventional and heat pipe seals.

FIG. 4 shows the interface and saturated vapor temperatures increased with increased rotating speed for both the conventional and heat pipe mating rings.

Example 3

In one embodiment, the mating ring of a seal in a centrifugal pump is replaced with a mating ring of the same external dimensions having an internal heat pipe configured substantially as described above. The internal cavity of the heat pipe is a sealed vacuum container with a small amount of working fluid which may be water. The cavity is lined with a few thin layers of wick material attached to the inside wall to transport the liquid working fluid from the low temperature areas of the cavity to the higher temperature end of the cavity. The evaporator section of the heat pipe is the portion of the cavity nearest the seal face and the region in which the working fluid is vaporized by the heat generated at the seal face. The heat input increases the pressure by vaporization and causes vapor to move to the lower temperature portions of the cavity. The condenser section is the part of the heat pipe cavity where the vapor condenses at or near the inner surface of the wick and releases heat to surrounding (heat output). The working fluid then returns to high temperature area by capillary action of the wick structure.

A large number of alternate embodiments of the present disclosure are possible. Such embodiments generally have wick material with sufficient capillary pressure to return a sufficient amount of fluid to the evaporator section for the heat duty of the heat pipe. Further, such embodiments generally have a cavity of sufficient size and configuration to maintain the vapor velocity at subsonic speeds. Further, such embodiments generally have a working fluid with a boiling point that is above the working temperature range of the heat pipe. Examples of working fluids that may be used may include water, ammonium hydroxide, methanol, acetone, heptane, and combinations thereof. Other working fluids may be selected based on operating conditions. Wick materials may be selected from any number of resilient porous media compatible with the working fluid including different varieties of steel and other alloys configured for wicking. Wick materials having good thermal conductivity and that resist degradation by the working fluid may be used in the embodiments described herein.

The heat pipe of the present embodiment is geometrically distinct from many traditional heat pipes. The heat pipe of the present embodiment has an internal primary condenser surface that is substantially perpendicular to the internal primary evaporator surface. Essentially, in the mating ring, one end face serves as the evaporator and the side-wall serves as the condenser. Because of this characteristic the heat pipe has a relatively large width compared to conventional heat pipes.

Example 4

Referring now to FIGS. 2 and 3 of the drawings the mating ring having an integrated heat pipe may be characterized by one or more of the following ratios which may be expressed as unit-less numbers.

$$\text{Face Ratio} = \frac{\text{Seal face to heat pipe depth 55}}{\text{Mating ring depth 13}}$$

$$\text{Prime Ratio} = \frac{\text{Heat pipe internal channel width 35}}{\text{Heat pipe outer wall flush length 87}}$$

$$\text{Width Ratio} = \frac{\text{Heat pipe internal channel width 35}}{\text{Mating ring seal face width 25}}$$

These ratios may be used to characterize certain groups of embodiments of which Example 2 is a member and of which many other alternate embodiments are members. Table 2 below describes 16 such groups of embodiments. For example, Example Set 4A describes a group of embodiments in which the Face Ratio is at most 0.15, the Prime Ratio is at least 0.25, the prime ratio is at most 4, and the With Ratio is at least 0.25.

TABLE 2

| Example Set | Face Ratio is at most | Prime Ratio is at least | Prime Ratio is at most | Width Ratio is at least |
|---|---|---|---|---|
| 4 A | 0.15 | 0.25 | 4 | 0.25 |
| 4 B | 0.05 | 0.25 | 4 | 0.25 |
| 4 C | 0.15 | 0.13 | 4 | 0.25 |
| 4 D | 0.05 | 0.13 | 4 | 0.25 |
| 4 E | 0.15 | 0.25 | 10 | 0.25 |
| 4 F | 0.05 | 0.25 | 10 | 0.25 |
| 4 G | 0.15 | 0.13 | 10 | 0.25 |
| 4 H | 0.05 | 0.13 | 10 | 0.25 |
| 4 I | 0.15 | 0.25 | 4 | 0.35 |
| 4 J | 0.05 | 0.25 | 4 | 0.35 |
| 4 K | 0.15 | 0.13 | 4 | 0.35 |
| 4 L | 0.05 | 0.13 | 4 | 0.35 |
| 4 M | 0.15 | 0.25 | 10 | 0.35 |
| 4 N | 0.05 | 0.25 | 10 | 0.35 |
| 4 O | 0.15 | 0.13 | 10 | 0.35 |
| 4 P | 0.05 | 0.13 | 10 | 0.35 |

Example 5

Referring now to FIGS. 2 and 3 of the drawings the mating ring having an integrated heat pipe may be characterized by one or more of the following additional ratios which may also be expressed as unit-less numbers.

$$\text{Depth Ratio} = \frac{\text{Heat pipe internal channel depth 50}}{\text{Mating ring depth 13}}$$

$$\text{Pipe Ratio} = \frac{\text{Heat pipe internal channel width 35}}{\text{Heat pipe internal channel depth 50}}$$

$$\text{Area Ratio} = \frac{\text{Cross-sectional area of heat pipe channel}}{\text{Cross-sectional area of full mating ring}}$$

$$\text{Axis Ratio} = \frac{\text{Heat pipe inner wall width 40}}{\text{Mating ring seal face width 25}}$$

These ratios may be used to characterize certain groups of embodiments of which Example 2 is a member and of which many other alternate embodiments are members. Table 3 below describes 16 such groups of embodiments. For example, Example Set 5A describes a group of embodiments in which the Axis Ratio is at most 0.15, the Depth Ratio is at least 0.90, the Area Ratio is at least 0.33, and the Pipe Ratio is at least 0.25. Each of Example Sets 5A-5P may share characteristics with any of Example Sets 4A-4P and each such combination is descriptive of both Example 2 and descriptive of a subset of embodiments which may be practiced in combination with the other features and characteristics described herein. By way of example, the subset of Example Set 5A having the features of Example Set 4A describes a group of embodiments in which the Face Ratio is at most 0.15, the Prime Ratio is at least 0.25, the prime ratio is at most 4, the With Ratio is at least 0.25, the Axis Ratio is at most 0.15, the Depth Ratio is at least 0.90, the Area Ratio is at least 0.33, and the Pipe Ratio is at least 0.25.

TABLE 3

| Example Set | Axis Ratio is at most | Depth Ratio is at least | Area Ratio is at least | Pipe Ratio is at least |
|---|---|---|---|---|
| 5 A | 0.15 | 0.90 | 0.33 | 0.25 |
| 5 B | 0.20 | 0.90 | 0.33 | 0.25 |
| 5 C | 0.15 | 0.85 | 0.33 | 0.25 |
| 5 D | 0.20 | 0.85 | 0.33 | 0.25 |
| 5 E | 0.15 | 0.90 | 0.25 | 0.25 |
| 5 F | 0.20 | 0.90 | 0.25 | 0.25 |
| 5 G | 0.15 | 0.85 | 0.25 | 0.25 |
| 5 H | 0.20 | 0.85 | 0.25 | 0.25 |
| 5 I | 0.15 | 0.90 | 0.33 | 0.15 |
| 5 J | 0.20 | 0.90 | 0.33 | 0.15 |
| 5 K | 0.15 | 0.85 | 0.33 | 0.15 |
| 5 L | 0.20 | 0.85 | 0.33 | 0.15 |
| 5 M | 0.15 | 0.90 | 0.25 | 0.15 |
| 5 N | 0.20 | 0.90 | 0.25 | 0.15 |
| 5 O | 0.15 | 0.85 | 0.25 | 0.15 |
| 5 P | 0.20 | 0.85 | 0.25 | 0.15 |

For systems having a geometry which makes calculation of the above ratios problematic, the ratios should be calculated using the furthest extent of Mating ring heat pipe cavity 20 to represent the boundaries between the body of Mating ring 10 and Mating ring heat pipe cavity 20. Similarly, the outermost extent of Mating ring 10 may be used to provide values for the calculation of the above ratios when alternate geometry makes calculation of those ratios problematic.

Example 6

In a related embodiment the primary ring of a pump seal system may incorporate a heat pipe having a geometry comparable to the geometry of the above described heat pipes and in a further related embodiment both the primary ring and the mating ring have an incorporated heat pipe having a geometry comparable to the geometry of the above described heat pipes.

Example 7

In a related embodiment, heat pipes configured similarly to those described herein for use in pump seals may be used in thrust bearing applications where significant radial heat dissipation is required in a ring element of the thrust bearing.

As that term is used herein "heat pipe" includes any device having a cavity enclosing a phase changing working fluid that is arranged and configured to use the phase changing working fluid to transfer heat from one solid surface to another solid surface regardless of geometry.

The above-described embodiments have a number independently useful individual features that have particular utility when used in combination with one another including combinations of features from embodiments described separately. There are, of course, other alternate embodiments which are obvious from the foregoing descriptions of the invention, which are intended to be included within the scope of the invention, as defined by the following claims.

We claim:

1. A sealing apparatus comprising:
   a. a seal face;
   b. a cavity;
   c. a wicking material within the cavity;
   d. a working fluid within the cavity; and
   e. a fluid barrier sealing the working fluid inside the cavity wherein the fluid barrier forms a complete and impermeable envelope enclosing the working fluid within the cavity;
   f. wherein the sealing apparatus is arranged and configured as a pump seal ring;
   g. wherein the sealing apparatus has a width ratio of at least 0.25; and
   h. wherein the working fluid is present as both a liquid and as a gas.

2. The sealing apparatus of claim 1 wherein the sealing apparatus has a width ratio of at least 0.35.

3. The sealing apparatus of claim 1 wherein the sealing apparatus has an area ratio of at least 0.25.

4. The sealing apparatus of claim 1 wherein the sealing apparatus has an area ratio of at least 0.33.

5. The sealing apparatus of claim 1 wherein the sealing apparatus has an pipe ratio of at least 0.15.

6. The sealing apparatus of claim 1 wherein the sealing apparatus has a pipe ratio of at least 0.25.

7. The sealing apparatus of claim 1 wherein the wicking material is steel.

8. The sealing apparatus of claim 1 wherein the working fluid is water.

9. A sealing apparatus comprising:
   a. a mating ring comprising
      i. a cavity,
      ii. a seal face,
      iii. a wicking material within the cavity,
      iv. a working fluid within the cavity,
      v. a fluid barrier sealing the working fluid inside the cavity wherein the fluid barrier forms a complete and impermeable envelope enclosing the working fluid within the cavity; and
      vi. a fluid exposed heat transfer surface;
      vii. wherein the cavity, the wicking material, and the working fluid are configured as a heat pipe; and
   b. a fluid flush in contact with the fluid exposed heat transfer surface.

10. The sealing apparatus of claim 9 wherein the fluid exposed heat transfer surface is within 25° of perpendicular to the seal face.

11. The sealing apparatus of claim 9 wherein the cavity is arranged and configured such that the fluid exposed heat transfer surface removes at least 40% of the heat input through the seal face.

12. The sealing apparatus of claim 9
   a. wherein the cavity is a channel having an internal channel width and an internal channel depth;
   b. wherein the mating ring has an outer wall flush length representing the depth of the fluid exposed heat transfer surface; and
   c. wherein the mating ring has a prime ratio of at least 0.13.

13. The sealing apparatus of claim 12 wherein the mating ring has a prime ratio of at most 10.

14. The sealing apparatus of claim 12 wherein the mating ring has a width ratio of at most 0.25.

15. The sealing apparatus of claim 12 wherein the mating ring has a width ratio of at most 0.35.

16. The sealing apparatus of claim 12 wherein the mating ring has an area ratio of at least 0.25.

* * * * *